(12) United States Patent
Imaki et al.

(10) Patent No.: US 9,007,600 B2
(45) Date of Patent: Apr. 14, 2015

(54) LASER RADAR SYSTEM

(75) Inventors: Masaharu Imaki, Tokyo (JP); Shumpei Kameyama, Tokyo (JP); Akihito Hirai, Tokyo (JP); Kimio Asaka, Tokyo (JP); Yoshihito Hirano, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 276 days.

(21) Appl. No.: 13/640,157

(22) PCT Filed: Apr. 18, 2011

(86) PCT No.: PCT/JP2011/059518
§ 371 (c)(1),
(2), (4) Date: Oct. 9, 2012

(87) PCT Pub. No.: WO2011/138895
PCT Pub. Date: Nov. 10, 2011

(65) Prior Publication Data
US 2013/0027715 A1  Jan. 31, 2013

(30) Foreign Application Priority Data

May 7, 2010  (JP) .................................. 2010-107574

(51) Int. Cl.
*G01B 11/24* (2006.01)
*G01S 17/93* (2006.01)
(Continued)

(52) U.S. Cl.
CPC ............... *G01S 17/936* (2013.01); *G01S 17/89* (2013.01); *G01S 7/4816* (2013.01); *G01S 17/10* (2013.01); *G01S 17/42* (2013.01)

(58) Field of Classification Search
CPC ........ G01S 17/42; G01S 17/89; G01S 17/936
USPC ................ 356/3, 3.02, 3.09, 3.11, 4.01, 5.01, 356/5.02, 5.03, 601
See application file for complete search history.

(56) References Cited

U.S. PATENT DOCUMENTS 3,180,205 A * 4/1965 Pickholtz et al. ............ 356/3.11
3,560,643 A * 2/1971 Love ............................. 348/145
(Continued)

FOREIGN PATENT DOCUMENTS

| JP | 2000 56018 | 2/2000 |
| JP | 2004 191199 | 7/2004 |
| JP | 2009 156810 | 7/2009 |

OTHER PUBLICATIONS

Imaki, M., et al., "Development of CW modulated 3D Imaging LADAR with scanless receiver," The Laser Rader Society of Japan, pp. 18 to 19, (2009) (with English abstract).
(Continued)

*Primary Examiner* — Kara E Geisel
*Assistant Examiner* — Rufus Phillips
(74) *Attorney, Agent, or Firm* — Oblon, McClelland, Maier & Neustadt, L.L.P.

(57) ABSTRACT

A laser radar system includes: a scanner for transmitting a pulse toward a target while two-dimensionally scanning a transmitting beam, and outputting scan angle information; a lens of the receiver for receiving received light; a high aspect photo detector array for converting the received light into a received signal; a transimpedance amplifier array for amplifying the received signal; an adder circuit for adding the received signal from each element of the transimpedance amplifier array; a distance detecting circuit for measuring a light round-trip time to the target of an output signal from the adder circuit; and a signal processing unit for causing the scanner to perform a two-dimensional scanning operation in association with the scan angle information, to determine distances to multiple points on the target based on the light round-trip time and a speed of light and measure a three-dimensional shape of the target.

1 Claim, 3 Drawing Sheets

(51) Int. Cl.
*G01S 17/89* (2006.01)
*G01S 7/481* (2006.01)
*G01S 17/10* (2006.01)
*G01S 17/42* (2006.01)

(56) References Cited

U.S. PATENT DOCUMENTS 6,301,003 B1 10/2001 Shirai et al.
7,557,914 B2 * 7/2009 Thompson et al. ........ 356/241.1

2004/0217899 A1 11/2004 Kikuchi

OTHER PUBLICATIONS

Hirai, A., et al., "Development of pulsed 3D Imaging LADAR," The Laser Rader Society of Japan, pp. 90 to 91 (2009) (with English abstract).

Kameyama, S., et al., "3D imaging LADAR with linear array devices: laser, detector and ROIC," Proc. of SPIE, vol. 7382 738209-1, Total 8 Pages, (2009).

International Search Report Issued Jul. 19, 2011 in PCT/JP11/59518 Filed Apr. 18, 2011.

* cited by examiner

LASER RADAR SYSTEM

TECHNICAL FIELD

The present invention relates to a laser radar system which transmits/receives laser light to/from a target to measure distances to multiple points on the target, for measuring a three-dimensional shape of the target based on distance information of the multiple points.

BACKGROUND ART

As a conventional laser radar system of this type, there is known a laser radar system described in Non Patent Literature 1, for example.

In this conventional laser radar system, a long light-receiving element having a large aspect ratio is used for a receiving system. With this, a large reception aperture for receiving a large amount of light is maintained, and a line-shaped field of view of the receiver, which is wide in a long-side direction of the light-receiving element, is secured in a scanless state. Further, within the line-shaped field of view, only a transmitting beam is one-dimensionally scanned at high speed with use of a MEMS scanner, and thus a sectional shape of a target is measured at high speed.

CITATION LIST

Non Patent Literature

[NPL 1] Imaki et al., "Development of CW modulated 3D Imaging LADAR with scanless receiver", 27th Japanese laser sensing symposium abstracts of papers, pp. 18-19, 2009

[NPL 2] Hirai et al., "Development of pulsed 3D Imaging LADAR", 27th Japanese laser sensing symposium abstracts of papers, pp. 90-91, 2009

SUMMARY OF INVENTION

Technical Problem

However, the conventional technology has the following problems. A wide field of view can be achieved only in the long-side direction of the light-receiving element, and hence only the sectional shape of the target can be imaged at high speed. Therefore, in order to measure a three-dimensional shape, both of the transmitting beam and the field of view of the receiver are scanned in a direction orthogonal to the long-side direction of the light-receiving element. When the field of view of the receiver is scanned under a state in which a large reception aperture is set for receiving a large amount of light, a large lens of the receiver having a large reception aperture is scanned. However, when the large lens of the receiver is scanned at high speed, a load on the scanner increases as a result. This shortens the life-span of the scanner due to wear of a scanner drive portion and the like, with the result that the life-span of the device as a whole is shortened, which has been a problem.

At this time, if the field of view of the receiver in the scanless state can be widened also in the direction orthogonal to the long-side direction of the light-receiving element, it becomes unnecessary to scan the field of view of the receiver in this orthogonal direction. In this case, it is only required to two-dimensionally scan a small-diameter transmitting beam, and thus the above-mentioned problem can be avoided. However, in this case, the following problem arises.

In order to achieve a wide field of view also in the direction orthogonal to the long-side direction of the light-receiving element, it has been necessary to set the size of the long light-receiving element close to a square by elongating a short side thereof. In this case, along with the increase in size of the light-receiving element, an electrical capacitance of the light-receiving element increases, with the result that a response frequency band of the light-receiving element reduces, which has been a problem. When this band reduction occurs, particularly in a case of employing ranging of a type in which a light pulse is transmitted/received, responsiveness to a short pulse reduces, with the result that a ranging accuracy reduces, which has been a problem.

The present invention has been made in order to solve the above-mentioned problems, and has an object to provide a laser radar system which is newly capable of achieving all a wide two-dimensional field of view in a reception scanless state, a large reception aperture, and responsiveness to a short pulse light.

Solution to Problem

According to the present invention, there is provided a laser radar system, including: a laser light source for generating pulse laser light based on a trigger signal and outputting the pulse laser light as a transmitting pulse; a scanner for transmitting the transmitting pulse toward a target while two-dimensionally scanning a pencil-shaped transmitting beam of the transmitting pulse in a long-side direction of a light-receiving element and in a direction orthogonal to the long-side direction of the light-receiving element, and outputting scan angle information; a lens of the receiver for receiving received light which has arrived after the transmitting pulse has been scattered by the target; a high aspect photo detector array for converting the received light into a received signal formed of an electrical signal domain and outputting the received signal, the high aspect photo detector array including long light-receiving elements arrayed in the direction orthogonal to the long-side direction of the light-receiving element; a trans impedance array for amplifying the received signal; an adder circuit for adding the received signal from each element of the transimpedance array; a distance detecting circuit for measuring a light round-trip time to the target of an output signal from the adder circuit; and a signal processing unit for causing the scanner to perform a two-dimensional scanning operation in association with the scan angle information, to thereby determine distances to multiple points on the target based on the light round-trip time and a speed of light and measure a three-dimensional shape of the target.

Advantageous Effects of Invention

According to the laser radar system of the present invention, it is possible to achieve both the wide two-dimensional field of view in a scanless state and the responsiveness to a short pulse, which has been difficult in a conventional case. With this, even when a three-dimensional shape is measured, it is only required to scan only a transmitting beam having a small beam diameter, and a small-sized scanner, for example, a MEMS scanner, can be used as the scanner. As a result, the load on the scanner is small even in high-speed scanning, which makes it possible to achieve a long-life scanner operation.

DESCRIPTION OF EMBODIMENTS

A laser radar system of the present invention is hereinafter described by means of preferred embodiments with reference to the drawings.

First Embodiment

Figure 1:
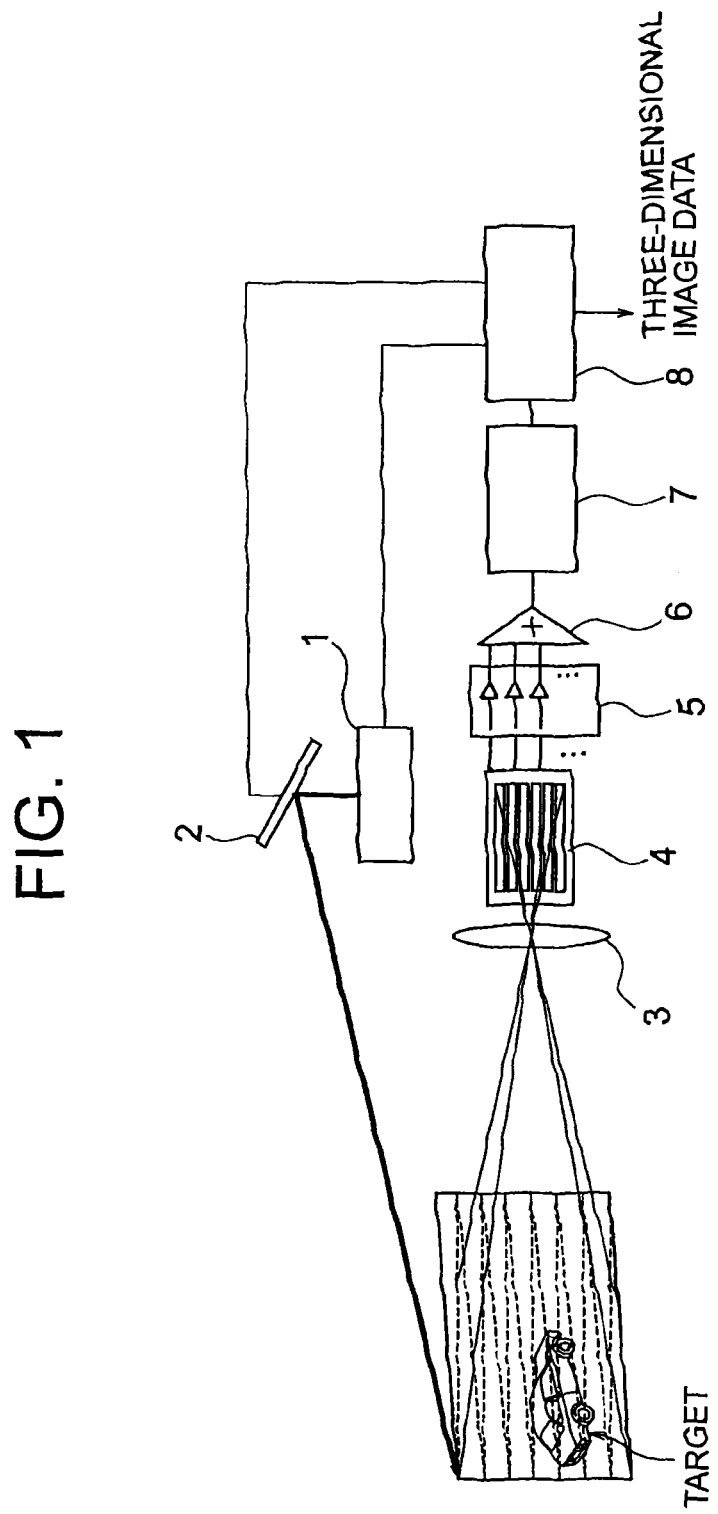
FIG. 1 A diagram illustrating a configuration of a laser radar system according to a first embodiment of the present invention.
Figure 2B:
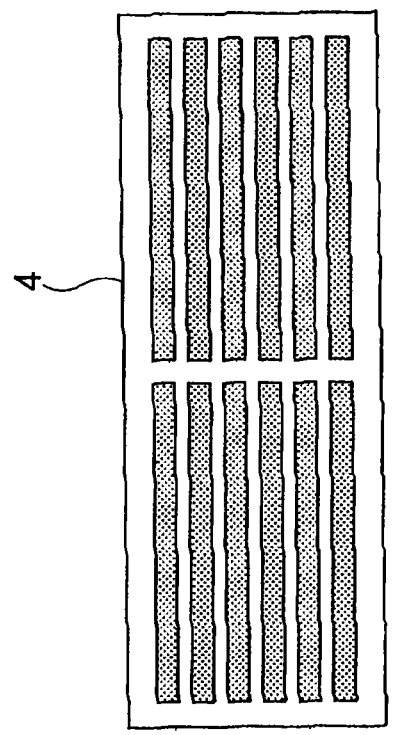
FIG. 2 Diagrams illustrating configurations of a high aspect photo detector array of the laser radar system according to the first embodiment of the present invention.
Figure 2A:
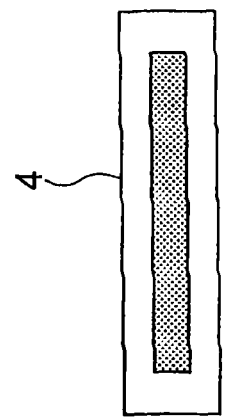

A laser radar system according to a first embodiment of the present invention is described with reference to FIGS. 1 and 2. FIG. 1 is a diagram illustrating a configuration of the laser radar system according to the first embodiment of the present invention. Further, FIG. 2 are diagrams illustrating configurations of a high aspect photo detector array of the laser radar system according to the first embodiment of the present invention. Note that, in the following, the same reference symbols in the respective drawings represent the same or corresponding parts.

In FIG. 1, the laser radar system according to the first embodiment of the present invention includes a laser light source 1, a scanner 2, a lens of the receiver 3, a high aspect photo detector array 4, a transimpedance amplifier array 5, an adder circuit 6, a distance detecting circuit 7, and a signal processing unit 8.

In FIG. 1, optical circuits each formed of a space are formed between the laser light source 1 and the scanner 2, and between the lens of the receiver 3 and the high aspect photo detector array 4.

Further, wires and cables are provided to connect between the signal processing unit 8 and the laser light source 1, between the signal processing unit 8 and the scanner 2, between the high aspect photo detector array 4 and the transimpedance amplifier array 5, between the transimpedance amplifier array 5 and the adder circuit 6, between the adder circuit 6 and the distance detecting circuit, and between the distance detecting circuit 7 and the signal processing unit 8.

In FIG. 1, the laser light source 1 has a function of generating pulse laser light based on a trigger signal from the signal processing unit 8, and transmitting the pulse laser light as a transmitting pulse. Further, the scanner 2 is driven by the signal processing unit 8, and has a function of transmitting the transmitting pulse toward a target while two-dimensionally scanning a transmitting beam of the transmitting pulse in a long-side direction of a light-receiving element, which is an irradiation direction of the transmitting pulse, and in a direction orthogonal to the long-side direction of the light-receiving element. In addition, the scanner 2 has a function of transmitting scan angle information to the signal processing unit 8.

Further, the lens of the receiver 3 has a function of receiving received light which has arrived after the transmitting pulse has been scattered by the target, and transmitting the received light onto the high aspect photo detector array 4. The high aspect photo detector array 4 has a function of converting the received light into received signals each formed of an electrical signal domain by a plurality of elements forming the array, and transmitting the received signals to the transimpedance amplifier array 5.

Respective elements of the transimpedance amplifier array 5 have a function of amplifying the received signals from the respective elements of the high aspect photo detector array 4, and then transmitting the amplified signals to the adder circuit 6. The adder circuit 6 has a function of adding output signals from the respective elements of the transimpedance amplifier array 5, and transmitting the added signal to the distance detecting circuit 7.

The distance detecting circuit 7 has a function of measuring a light round-trip time to the target of an output signal from the adder circuit 6, and transmitting the measured time to the signal processing unit 8. The signal processing unit 8 controls an operation timing of each of the laser light source 1, the scanner 2, and the distance detecting circuit 7, and has a function of causing the scanner 2 to perform a two-dimensional scanning operation in the long-side direction of the light-receiving element and in the direction orthogonal to the long-side direction of the light-receiving element while associating the light round-trip time to the target and the angle information of the scanner 2 with each other, to thereby obtain information on distances to multiple points on the target and measure a three-dimensional shape of the target.

In FIG. 1, one element (long light-receiving element) of the high aspect photo detector array 4 has an element size which is small to an extent that the one element can respond a short pulse, but has a large aspect ratio. With this, in the long-side direction, a wide line-shaped field of view is achieved even with only one element. Moreover, as illustrated in FIG. 1, a plurality of the elements are arrayed in the direction orthogonal to the long-side direction of the light-receiving element, and thus a wide field of view is also achieved in the direction orthogonal to the long-side direction of the light-receiving element. Note that, the high aspect photo detector array 4 may be formed of a single element as illustrated in FIG. 2(*a*), or may be formed of a two-dimensional array as illustrated in FIG. 2(*b*).

Next, an operation of the laser radar system according to the first embodiment is described with reference to the drawing.

First, the laser light source 1 generates pulse laser light based on a trigger signal from the signal processing unit 8, and transmits the pulse laser light as a transmitting pulse. Further, the scanner 2 is driven by the signal processing unit 8, to thereby transmit the transmitting pulse toward a target while two-dimensionally scanning a transmitting beam of the transmitting pulse in the long-side direction of the light-receiving element, which is an irradiation direction of the transmitting pulse, and in the direction orthogonal to the long-side direction of the light-receiving element. In addition, the scanner 2 transmits the scan angle information to the signal processing unit 8. At this time, the transmitting beam is formed into a pencil-shaped beam so that an irradiation spot size on the target becomes equal to or smaller than a desired pixel resolution.

The transmitting pulse is scattered on the target, and received light which has arrived after the transmitting pulse has been scattered by the target is transmitted onto the high aspect photo detector array 4 via the lens of the receiver 3.

Next, the high aspect photo detector array 4 converts the received light into received signals each formed of an electrical signal domain by the plurality of elements forming the array, and transmits the received signals to the transimpedance amplifier array 5.

Next, the transimpedance amplifier array 5 amplifies the received signals from the plurality of elements of the high aspect photo detector array 4 by the corresponding elements, and transmits the amplified signals to the adder circuit 6.

Next, the adder circuit 6 adds the signals from the respective elements of the transimpedance amplifier array 5 to obtain one signal, and transmits the one signal to the distance detecting circuit 7.

Next, the distance detecting circuit 7 measures a light round-trip time to the target of the output signal from the adder circuit 6, and transmits the measured time to the signal processing unit 8. A specific circuit configuration of the distance detecting circuit 7 for measuring the round-trip time is described in Non Patent Literature 2. When a gate signal synchronized with the trigger signal for driving the laser light source 1 is input from the signal processing unit 8 to the distance detecting circuit 7, the distance detecting circuit 7 outputs an analog voltage proportional to the round-trip time.

Then, the signal processing unit 8 obtains the light round-trip time to the target by AD-converting the value of the analog voltage output from the distance detecting circuit 7. Further, from the light round-trip time and the speed of light, the signal processing unit 8 measures the distance to the target. At this time, the transmitting beam is formed into a thin pencil-shaped beam, and hence the measured region on the target is only one point, and the distance to this point is measured.

Further, the signal processing unit 8 performs this distance measurement by causing the scanner 2 to perform a two-dimensional scanning operation in the long-side direction of the light-receiving element and in the direction orthogonal to the long-side direction of the light-receiving element in association with the angle information of the scanner 2, that is, a transmitting direction of the transmitting beam. With this, information on distances to multiple points on the target can be obtained, with the result that the three-dimensional shape of the target can be measured.

In the laser radar system according to the first embodiment of the present invention, in order to maintain the responsiveness to a short pulse, one light-receiving element is formed into a long shape and is limited in size, and thus a wide field of view of the receiver in the long-side direction of the light-receiving element, which is the advantage of the long shape, is achieved. Further, the long light-receiving elements are arrayed in the direction orthogonal to the long-side direction of the light-receiving element, and thus a wide field of view is also achieved in the direction orthogonal to the long-side direction of the light-receiving element. With this, it is possible to achieve both a wide two-dimensional field of view of the receiver in a scanless state and the responsiveness to a short pulse, which has been difficult in a conventional case. Further, even when the three-dimensional shape is measured, it is only required to scan a transmitting beam having a small beam diameter, and a small-sized scanner, for example, a MEMS scanner, can be used as the scanner 2. As a result, there are effects that a load on the scanner 2 is small even in high-speed scanning, and a long-life scanner operation can be achieved.

Further, in the laser radar system according to the first embodiment of the present invention, the light-receiving element and the transimpedance are each an array, and are each formed of a plurality of elements, but the outputs therefrom are added by the adder circuit 6 to obtain one signal. That is, the light-receiving element array 4, the transimpedance amplifier array 5, and the adder circuit 6 equivalently constitute a receiving system of a single element, with the result that it is unnecessary to form the distance detecting circuit 7 connected at the subsequent stage into an array. With this, the circuit configuration is simplified, and thus the device can be manufactured at low cost with high reliability.

Further, in the laser radar system according to the first embodiment of the present invention, the following advantages are present. Generally, when the light-receiving element is an array, the number of elements in the array determines the number of pixels of the three-dimensional image. However, in the device of the present invention, measurement is performed pixel by pixel for each transmitting pulse while changing an irradiation point of the transmitting beam. Therefore, the number of pixels is determined by the number of transmitting pulses transmitted within a time period for measuring one frame. Therefore, as a larger number of pulses is transmitted within the frame measuring time period by increasing the repetition frequency of the transmitting pulse, the number of pixels which may be measured within the frame increases. Therefore, measurement can be performed with the number of pixels equal to or larger than the number of elements of the array. In other words, as compared to the case of a general array reception, measurement results of the same number of pixels can be achieved with a smaller number of array elements, which generates the effects that the configuration is simplified and the device can be manufactured at low cost with high reliability. Those effects can be obtained because the device of the present invention can grasp the position at which the transmitting beam is applied on the device side, and it is unnecessary to associate the measurement position with the element of the light-receiving element array.

Note that, in the laser radar system according to the first embodiment of the present invention, when the high aspect photo detector array 4 is arranged, gaps are formed between the array elements. When the received light is condensed by the lens of the receiver 3 so as to enter the high aspect photo detector array 4, in a case where the received light is condensed to the gaps, the received light cannot be converted into an electrical signal, with the result that the irradiation position of the transmitting beam at this time may become a dead zone. In this case, the following measure may be further employed to avoid this problem. The high aspect photo detector array 4 is arranged at a position deviated from a focal distance of the lens of the receiver 3. With this, a spot of the received light from the lens of the receiver 3 is applied onto the high aspect photo detector array 4 in an expanded state relative to a point-like condensed state. At this time, when the spot of the received light is set to be larger than the size of the gaps, received light enters at least one long light-receiving element, which makes it possible to avoid the generation of the above-mentioned dead zone. At this time, received signals are output from two or more long light-receiving elements, but the received signals are added by the adder circuit 6 at the subsequent stage, and hence it is also possible to avoid significant loss of the signal energy.

Second Embodiment

Figure 3:
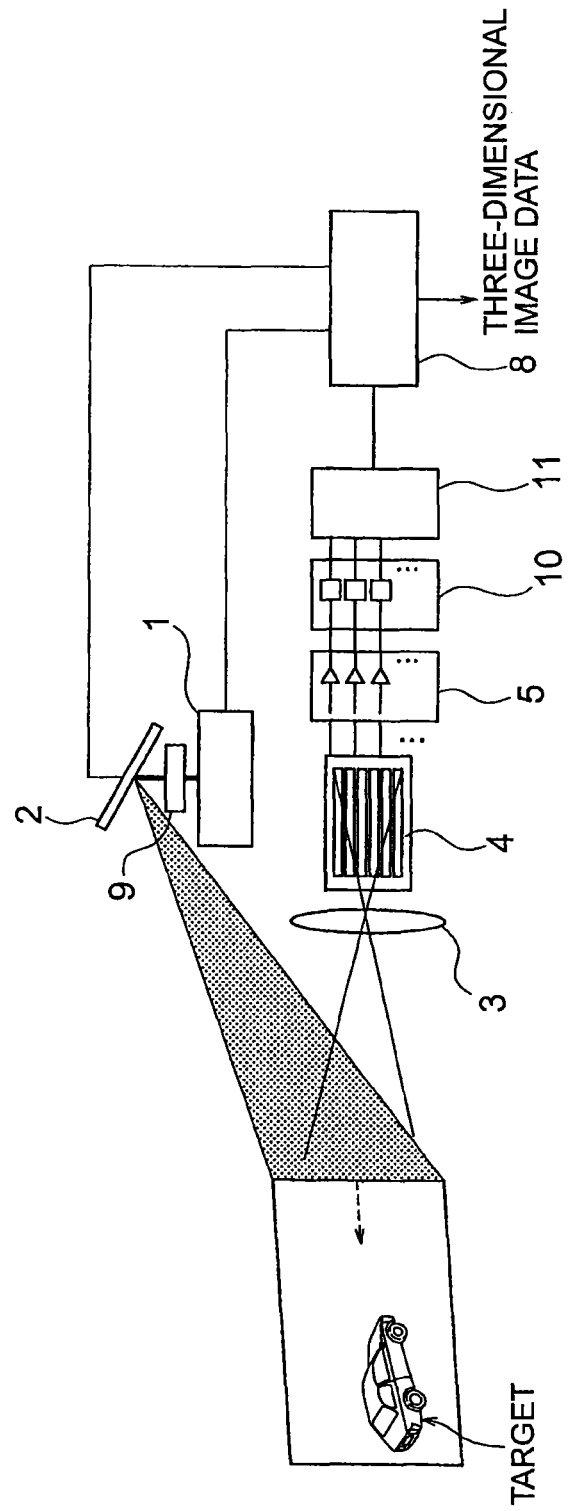
FIG. 3 A diagram illustrating a configuration of a laser radar system according to a second embodiment of the present invention.

A laser radar system according to a second embodiment of the present invention is described with reference to FIG. 3. FIG. 3 is a diagram illustrating a configuration of the laser radar system according to the second embodiment of the present invention.

In FIG. 3, the laser radar system according to the second embodiment of the present invention includes the laser light source 1, a beam shaping lens 9, the scanner 2, the lens of the receiver 3, the high aspect photo detector array 4, the transimpedance amplifier array 5, a distance detecting circuit array 10, a multiplexer 11, and the signal processing unit 8.

Next, an operation of the laser radar system according to the second embodiment is described with reference to the drawing.

The basic configuration and operation of the second embodiment are similar to those of the above-mentioned first embodiment. Different points are described in the following.

In FIG. 3, the beam shaping lens 9 shapes the transmitting beam of the transmitting pulse from the laser light source 1 into a line-shaped beam, and the line-shaped beam is applied onto a certain line on the target at a time. The line-shaped beam at this time is long in a direction orthogonal to a line-shaped field of view of the receiver generated by one element of the high aspect photo detector array 4.

The scanner 2 is not a two-dimensional type scanner but a one-dimensional type line scanner, and the irradiation beam is scanned in the long-side direction of the light-receiving element.

Elements of the distance detecting circuit array 10 are connected to the elements of the high aspect photo detector array 4, respectively. The multiplexer 11 selects one of the outputs of the respective elements of the high aspect photo detector array 4, and transmits the one output to the signal processing unit 8.

The signal processing unit 8 newly has a switching function of switching the outputs from the respective elements of the distance detecting circuit array 10 to be selected by the multiplexer 11.

In the laser radar system of FIG. 3, unlike the laser radar system of FIG. 1, a certain line on the target is irradiated with the line-shaped beam at a time. Further, scattered light from respective points is condensed on the respective elements of the high aspect photo detector array 4 corresponding to the respective points with use of the lens of the receiver 3. The elements of the high aspect photo detector array 4 each convert the received light into a received signal formed of an electrical signal. The received signal is subjected to parallel processing by a corresponding element of the transimpedance amplifier array 5 and a corresponding element of the distance detecting circuit array 10. In this manner, distances to the respective irradiated points on the target are simultaneously detected.

Next, through the switching by the multiplexer 11, distance information from the respective elements of the distance detecting circuit array 10, specifically, an analog voltage proportional to the light round-trip time is read out to be AD converted in the signal processing unit 8. Then, from the analog voltage, the distance to the target for each element is determined. At this time point, a sectional shape of the target in the irradiation direction of the transmitting beam is measured. This measurement of the sectional shape is performed while one-dimensionally scanning in the long-side direction of the light-receiving element. As a result, a three-dimensional image can be measured.

Note that, in the laser radar system according to the second embodiment of the present invention, the following effects are provided. As described in the above-mentioned first embodiment, in order to maintain the responsiveness to a short pulse, one light-receiving element is formed into a long shape and is limited in size, and thus a wide field of view of the receiver in the long-side direction of the light-receiving element is achieved. In addition, even in high-speed scanning, a long life-span can be maintained.

Further, the distance detecting circuit array 10 in which the distance detecting circuits 7 are arrayed is used. Thus, although there is a problem in that the device becomes complicated, a sectional shape of a certain line of the target can be acquired at a time with one transmitting pulse, and hence the number of transmitting pulses necessary for obtaining one three-dimensional shape can be reduced. Therefore, in the case of the same measurement rate, the repetition frequency of the transmitting pulse can be decreased, and from a different perspective, an imaging rate can be increased in the same repetition frequency of the transmitting pulse.

REFERENCE SIGNS LIST 1 laser light source, 2 scanner, 3 lens of the receiver, 4 high aspect photo detector array, 5 transimpedance amplifier array, 6 adder circuit, 7 distance detecting circuit, 8 signal processing unit, 9 beam shaping lens, 10 distance detecting circuit array, 11 multiplexer

The invention claimed is:
1. A laser radar system, comprising:
a laser light source for generating pulse laser light based on a trigger signal and outputting the pulse laser light as a transmitting pulse;
a scanner for transmitting the transmitting pulse toward a target while two-dimensionally scanning a pencil-shaped transmitting beam of the transmitting pulse in a long-side direction of a light-receiving element and in a direction orthogonal to the long-side direction of the light-receiving element, and outputting scan angle information;
a lens of the receiver for receiving received light which has arrived after the transmitting pulse has been scattered by the target;
a high aspect photo detector array for converting the received light into a received signal formed of an electrical signal domain and outputting the received signal, the high aspect photo detector array comprising long light-receiving elements arrayed in the direction orthogonal to the long-side direction of the light-receiving element;
a transimpedance amplifier array for amplifying the received signal;
an adder circuit for adding the received signal from each element of the transimpedance amplifier array;
a distance detecting circuit for measuring a light round-trip time to the target of an output signal from the adder circuit; and
a signal processing unit for causing the scanner to perform a two-dimensional scanning operation in association with the scan angle information, to thereby determine distances to multiple points on the target based on the light round-trip time and a speed of light and measure a three-dimensional shape of the target.

* * * * *